US006681247B1

(12) United States Patent
Payton

(10) Patent No.: US 6,681,247 B1
(45) Date of Patent: Jan. 20, 2004

(54) COLLABORATOR DISCOVERY METHOD AND SYSTEM

(75) Inventor: David W. Payton, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/420,041

(22) Filed: Oct. 18, 1999

(51) Int. Cl.[7] .................................................. G06F 15/16
(52) U.S. Cl. ........................ 709/217; 709/203; 709/204; 707/6; 707/10; 707/5
(58) Field of Search ........................ 707/6, 10, 1, 5; 709/219, 218, 217, 204, 206, 203

(56) References Cited

U.S. PATENT DOCUMENTS

| | | | |
|---|---|---|---|
| 4,870,579 A | | 9/1989 | Hey |
| 4,876,731 A | | 10/1989 | Loris et al. |
| 4,996,642 A | * | 2/1991 | Hey ............................. 273/161 |
| 5,636,326 A | | 6/1997 | Stork et al. |
| 5,727,129 A | * | 3/1998 | Barrett et al. ............... 345/841 |
| 5,754,938 A | * | 5/1998 | Herz et al. ...................... 705/74 |
| 5,790,426 A | | 8/1998 | Robinson |
| 5,819,247 A | | 10/1998 | Freund et al. |
| 5,857,175 A | | 1/1999 | Day et al. |
| 5,859,925 A | | 1/1999 | Yaeger et al. |
| 5,870,744 A | | 2/1999 | Sprague |
| 5,884,282 A | * | 3/1999 | Robinson ...................... 705/12 |
| 6,041,311 A | * | 3/2000 | Chislenko et al. ............ 705/27 |
| 6,052,122 A | * | 4/2000 | Sutcliffe et al. ............. 345/751 |
| 6,321,179 B1 | * | 11/2001 | Glance et al. ............... 702/189 |
| 6,385,619 B1 | * | 5/2002 | Eichstaedt et al. ............. 707/1 |

OTHER PUBLICATIONS

Balabanovic et al., "Content–Based, Collaborative Recommendation", Mar. 1997, Communication of the ACM, vol. 40, No. 3 pp. 66–72.*
P. Maes, "Social interference agents: acquiring competence by learning from users and other agents", In working notes of the AAAI Spring Symposium on Software Agents, Stanford, CA pp. 71–78.
U. Shardanad ANDP, MAES, Social information filtering: Algorithms for automating "Word of Mouth", to appear in CHI–95 Conference, Denver, CO, May 1995.
D. W. Payton, "Discovering Collaborators by Analyzing Trails Through an Information Space," D. Jensen and H. Goldberg, Cochairs Papers from the 1998 AAAI Fall Symposium, Oct. 23–25, Orlando, Florida, Technical Report FS–98–01, AAAI Press, Melo Park, California.

* cited by examiner

Primary Examiner—Dung C. Dinh
Assistant Examiner—Kevin Parton
(74) Attorney, Agent, or Firm—Tope-McKay & Associates

(57) ABSTRACT

A collaborator discovery method and system is presented for tracking and correlating user activities with respect to information resources on an electronic network to assist users in finding others with common interests. The system includes a monitor for tracking user activities, an entry processor for updating and providing monitored activities to a match database, and a matcher to correlate user activities and to diffuse user interests to information resources that have not yet been visited. Long-term and short-term user interests are tracked, and are decayed over time for resources not recently visited. Information sources whose associated interest level has sufficiently decayed are pruned, and their entries in the match database are eliminated. An interactive messaging system is also provided for users to interact, while preserving their anonymity.

38 Claims, 8 Drawing Sheets

| Item Index Identifier | Item Source Address | Total Visitors | Number of Scent Score Entries | Number of Links from Item | Forward Scan Status | Backward Scan Status |
|---|---|---|---|---|---|---|
| ● ● ● | ● ● ● | ● ● ● | ● ● ● | ● ● ● | ● ● ● | ● ● ● |

Item Index

FIG. 3

| Source Item Index Identifier | Destination Item Index Identifier | Linkage |
|---|---|---|
| ● ● ● | ● ● ● | ● ● ● |

Linkage Table

FIG. 4

| User Identification | Item Index Identifier | Last Hit Time Stamp | Short-Term Scent Score | Long-Term Scent Score |
|---|---|---|---|---|
| ••• | ••• | ••• | ••• | ••• |

Hit Table

FIG. 5

Correlations Table

| User ID X | User ID Y | Short-Term Scent Score | Long-Term Scent Score | Long-Term to Short-Term Scent Score |
|---|---|---|---|---|
| ● ● ● | ● ● ● | ● ● ● | ● ● ● | ● ● ● |

FIG. 6

COLLABORATOR DISCOVERY METHOD AND SYSTEM

BACKGROUND OF THE INVENTION (1) Field of the Invention

The present invention is related to a method and an apparatus for computer networks such as the Internet, wide area networks (WANs), metropolitan area networks (MANs), and local area networks (LANs). More specifically, it provides a method and an apparatus that allows for correlating interests of people by tracking and analyzing their actions in a computer environment or based on their actions with respect to items cataloged in a computer environment.

(2) Background of the Invention

The Internet connects thousands of individuals as well as many disparate networks across the world in industries such as education, military, government, research, and others. The Internet utilizes transmission control protocol/Internet protocol (TCP/IP) as a standard for transmitting information. An intranet is a local area network supporting a single organization, for example a company or an educational institution. Through an intranet, users may partake in various activities such as e-mailing, web browsing, and transferring files. The growth of the Internet as a means of communication has been explosive, with the World Wide Web becoming a major marketing channel as well as a major source of information and e-mail becoming a major means of communication among the population.

Because of the computerized nature of the Internet and other networks, a rich source of tracking data is available which may be beneficially correlated. Through the use of various networks, people are able to communicate as well as to search for information from various sources such as web sites. The networking environment provides an opportunity for potentially meaningful and productive work-related interaction among users. To promote user interaction, it is desirable to correlate certain user history or access data and to make the correlation results available to other users. It is therefore desirable to have a method and apparatus for users connected to a network to access information regarding others with whom the users' histories correlate, and to provide the users with data to allow them to determine others with similar, common interests.

In the prior art, methods have been developed for identifying people with common interests for the purpose of providing recommendations regarding various information sources. Systems of this type typically require explicit input of current user preferences in order to predict future preferences through computer analysis of content. In some cases, these systems require the system developer to categorize content items into predetermined classes. Therefore, it is also desirable to provide a system that does not require computer analysis of the content of information sources accessed, and which does not require that information be pre-categorized in any way. These characteristics are particularly advantageous if the types of information being accessed are multimedia rather than text, where performing meaningful content analysis of video or audio sources can be far more difficult than it is with text-only sources.

A related method for information filtering is known as collaborative filtering. Instead of attempting to analyze documents based on keywords or content, collaborative filtering techniques transform each user into the role of a critic or magazine editor. Any given individual is capable of deciding what they like or dislike, and whether the information they are looking at is relevant to their current interests or needs. The user merely has to organize and rank the information he or she sees in terms of his or her own personal evaluation criteria. If a number of users have similar evaluation criteria, sharing the results of their evaluations can provide each user with the benefits of exposure to a much broader range of relevant information. In this way, each member of the group serves as a "recognition engine" to identify and evaluate information that might be appropriate to share with other users. Because this evaluation is performed by human minds, associations based on deep understanding are possible for information in diverse formats, whether they be speech, images, text, or video.

The concept of collaborative filtering has been likened to the notion of automating the "word of mouth" process that works so well among friends and colleagues. Usually people know which of their friends or associates have similar tastes to their own. For example, when choosing a movie, people will most often ask the opinion of others who have likes and dislikes similar to their own. A recommendation from someone who is known to have similar tastes to our own will carry far more weight than one from another source.

In collaborative filtering techniques, user groupings are dynamic and may change as rapidly as users' needs or interests change. Collaborative filtering techniques take advantage of the fact that there are thousands of users, both past and present, each having accessed a broad range of different items, and each having opinions about the information they obtain. A centralized server is used in collaborative filtering systems to act as the matchmaker needed to group people who have similar needs or interests. In order to benefit from their collective opinions, these users need not have ever heard of, met, or seen each other, and they may even be located at opposite ends of the world. All that matters is that they have given similar ratings to many of the same sources of information. These ratings alone can then be applied to suggest to a user new sources of information that he or she has not yet seen.

U.S. Pat. No. 4,996,642, entitled "System and Method for Recommending Items" and its related patent, U.S. Pat. No. 4,870,579 describe a recommendation system that uses collaborative filtering techniques. This system relies on explicit user ratings of items in order to perform clustering of users according to their common likes and dislikes. Furthermore, the output of this system is not intended to help people identify others like themselves, but to provide specific recommendations about items they may wish to use, rent, or purchase.

The present invention differs from these patents and methods in that it does not rely on explicit user input such as ratings. Because the system is intended to primarily match users with common interests rather than to provide recommendations to those users, the system does not require input about user opinions regarding information accessed. Instead, it is able to make use of data about users' patterns of information access and their modes of use of the information once it is accessed.

U.S. Pat. No. 5,870,744, entitled "Virtual People Networking" describes a system which allows multiple people working for the same organization with similar interests to automatically interface with each other when any one of the people accesses any given one of multiple electronic sites provided through an intranet of the organization. The system described tracks a user's access pattern and provides the access pattern to other users upon request. The system also allows users to explicitly rate particular sites and to provide messages regarding a particular site to subsequent users who view their access patterns.

The present invention differs from this patent in that it does not simply provide user access patterns to other users. Rather, it correlates user access data and implicitly determines content similarity of sites through an analysis of access patterns. Furthermore, it provides an implicit interest rating system based on the number of times an individual user accesses a particular site. The rating system also takes into account the passage of time through the use of a decay factor, which degrades the determined user interest in a particular site over time.

Further references:

Goldberg, David et al., "Using Collaborative Filtering to Weave an Information Tapestry," Communications of the ACM, December 1992, Vol. 35, No. 12, pp. 61–70.

Maes, P. (1994) Social interface agents: acquiring competence by learning from users and other agents. In Working Notes of the AAAI Spring Symposium on Software Agents, Stanford, Calif. p. 71–78.

Shardanand, U., and Maes, P., (1995) Social Information Filtering: Algorithms for Automating "Word of Mouth," appearing in CHI-95 Conference, Denver, Colo. May 1995.

SUMMARY OF THE INVENTION

In accordance with the present invention, a collaborator discovery method and system are presented. The method provides for collaborator discovery among a plurality of users, and generally includes the steps of: (a) providing a user history including a plurality of entries, with each entry including a user identity associated with each particular user and a reference to a particular item accessed by that user; (b) associating particular items in the user history by providing a measure of similarity between the particular items; (c) uniquely associating at least one scent score to each particular item accessed by a particular user (scent scores will be discussed in detail further below); (d) diffusing the at least one scent score associated with a particular item accessed by a particular user to another item by generating at least one diffusion scent score from the combination of the measure of similarity between the particular item and the other item and the at least one scent score, and incorporating the at least one diffusion scent score into the at least one scent score of the other item; (e) repeating step (d) for all items which have at least one scent score; and (f) determining scent match scores by correlating the scent scores from all of the particular items to find users with common interests. The user history may be generated by monitoring and recording the real-time accesses of the plurality of users, and steps (b) through (f) may be repeated a plurality of times to provide a continual update of the scent scores. The measure of similarity may be generated in a number of ways and based on a number of factors such as the temporal proximity of accesses between particular items. The scent scores may be increased over time in proportion to the number of times a particular item is accessed in order to provide a measure of a user's interest in the item. Particular items, such as large, general interest Internet search engines or other items which are likely to be accessed frequently, but that are likely to yield little useful information regarding user interests, may be filtered out of the user history. After the user scent scores have been correlated, this information may be provided to the users in order to assist them in finding others with similar interests. To account for the difference between short-term and long-term user interests, different scent scores may be utilized with different rates of increase in order to help differentiate between users sharing only a passing, short-term, interest and those with similar long-term interests. The scent scores may also be decayed in order to account for changes in user interests over time. A messaging system such as a chat facility or an e-mail system (as well as e-mail blocking) may be provided to enable users to communicate with each other, and privacy enhancements may be added to provide for user anonymity.

The system of the present invention includes an activity monitor which provides a user history, with a plurality of entries, each including a user identity associated with a particular user and a reference to a particular item accessed by that user. The activity monitor may be centralized or it may be distributed among the users' systems, or it may be a hybrid of the two. An entry processor is connected to the activity monitor to receive the plurality of entries of the user history from the activity monitor, and is operative to associate pairs of particular items in the user history to provide a measure of similarity for each pair, and to uniquely associate at least one scent score for each particular item accessed by a particular user. A match database is connected to the entry processor to receive and store the measure of similarity and the scent scores. A matcher is connected to the match database to receive the measure of similarity and the scent scores, and to diffuse the scent scores to other items in the user history in proportion to the measure of similarity and to correlate the scent scores of all of the particular items in the user history to determine users with common interests. The user history may be generated by monitoring and recording the real-time accesses of the users. The system may thus provide a continual update of the scent scores. The measure of similarity may be generated in a number of ways and based on a number of factors such as the temporal proximity of accesses between particular items. The scent scores may be increased over time in proportion to the number of times a particular item is accessed in order to provide a measure of a user's interest in the item. A filter may be provided to eliminate from the user history particular items, such as large, general interest Internet search engines or other items that are likely to be accessed frequently, but that are likely to yield little useful information regarding user interests. After the user scent scores have been correlated, this information may be provided to the users in order to assist them in finding others with similar interests. To account for the difference between short-term and long-term user interests, different scent scores may be utilized with different rates of increase in order to help differentiate between users sharing only a passing, short-term, interest and those with similar long-term interests. A decay engine may be provided to decrease the scent scores in order to account for changes in user interests over time. A means for messaging such as a chat facility or an e-mail system may be provided to enable users to communicate with each other, and a means to provide user anonymity may be provided to allow for user privacy.

BRIEF DESCRIPTION OF THE DRAWINGS

FIG. 3 provides an example item index table component of the match database;

FIG. 4 provides an example linkage table component of the match database;

FIG. 5 provides an example hit table component of the match database;

FIG. 6 provides an example correlations table component of the match database;

DETAILED DESCRIPTION

Figure 1:
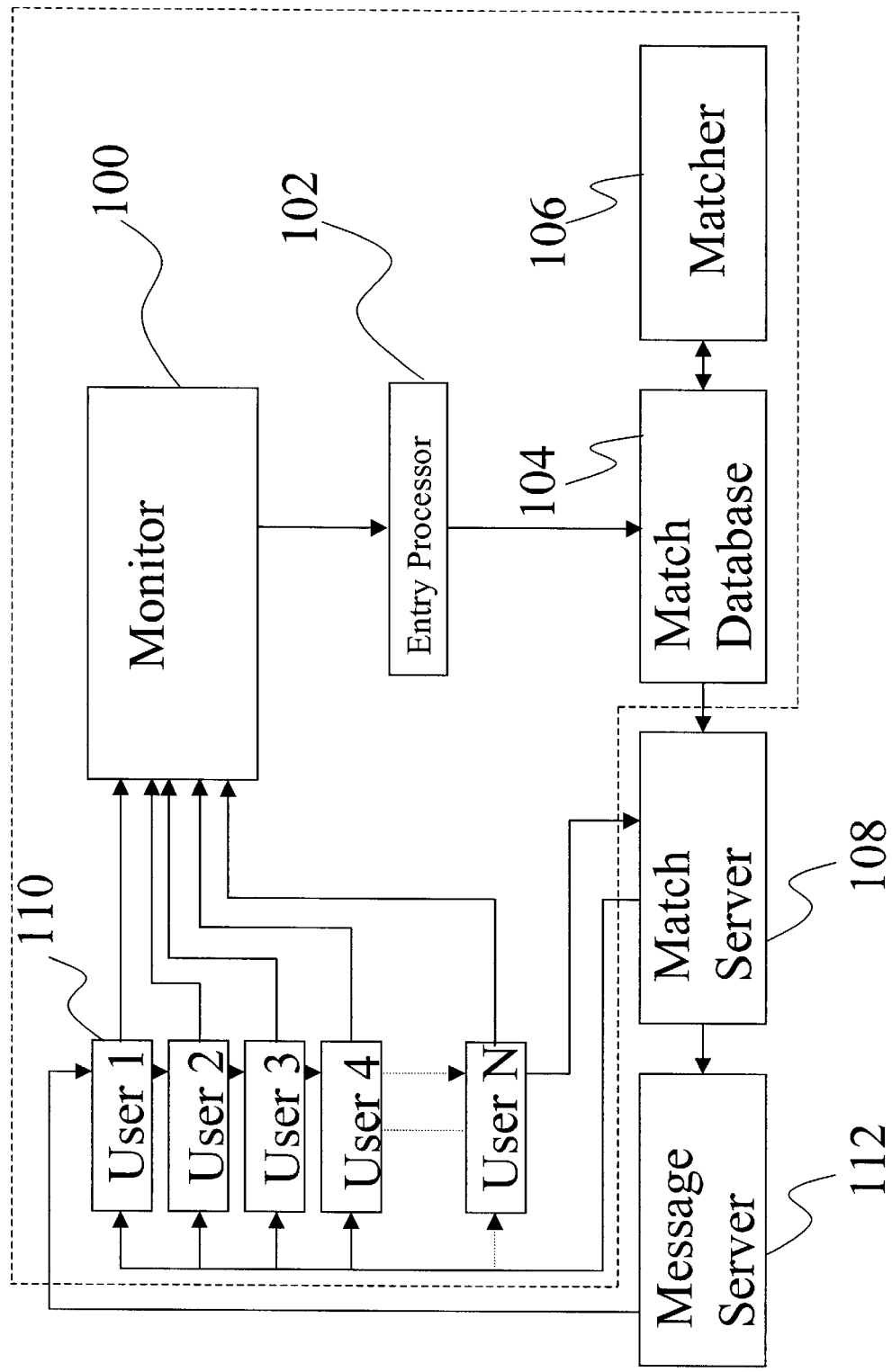
FIG. 1 provides a system overview of an embodiment of the present invention demonstrating the relationship between the major components.

The present invention is useful for determining potential collaborators by monitoring their information gathering and organizing activities, and may be tailored to a variety of applications. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

An object of the present invention is to help people find others who might be well suited as collaborators because of an apparent commonality of interests. It is a further object of the present invention to identify potential collaborators on the basis of passively acquired data about users' habits with regard to what information they access and how they organize such information for their own use. In this description, as well as throughout the remainder of this application, the phrase "passively acquired" is used to indicate that the data about people's habits is not obtained through any form of explicit questioning of the individuals involved. Instead, all data is to be acquired as a byproduct of people's ordinary information gathering and organizing activities so as to minimize the impact the system has on people's time and attention. It is an additional object of the present invention to analyze patterns of information access without regard to the specific nature or content of the information being accessed. All that is needed is a unique information identifier to distinguish each item, such as a uniform resource locator (URL) in the case of the World Wide Web.

Human patterns of information access can reveal a great deal about user interests. As a consequence, a commonality of access patterns between two or more individuals can reveal a commonality of interests between the individuals. For example, if several people read the same articles in a magazine or view the same pages on the World Wide Web, or call the same phone numbers, there exists a possibility that these people have some interests in common. Furthermore, the possibility that these people have interests in common increases as the number of items they have accessed in common increases. The likelihood that two people who have accessed items in common also have particular interests in common further increases the more the items accessed tend to be highly specialized and rarely accessed by others. The fact that two people have both read the same lead article in a major newspaper or have both accessed the home page of a major Internet search engine says relatively little about any common interests they may have. On the other hand, should these same two people both have visited an obscure web page on a rare topic, then they are more likely to have some common interests of a very specialized nature.

The fact that an item accessed may actually fail to satisfy a person's intended purpose or need for accessing that item does not deter from the usefulness of that access event as an indicator of the person's interests. If the person felt there was something worthwhile in that item either because of how it was referenced, because of a recommendation, or because of its title, the fact that the person thought the item might conform to their interests means that others with the same interests might do the same.

Even people with a significant degree of interests in common often may not access exactly the same items. Because of this fact, another object of the present invention is to provide a means to infer similarity between items accessed by observing access patterns over time. While other approaches have concentrated on content analysis as a means for determining similarity, the present invention exploits the fact that human information access tends to follow a continuity of interests, rather than jump between discrete pockets of diverse interests. Therefore, items accessed in succession by a user can be grouped as having some minor degree of similarity. This measure of similarity between items can be enhanced with repeated association of items either by the same user or different users.

The present invention generally involves several steps. First, an activity history profile is developed for each user by classifying and recording their activities of accessing information sources by associating a unique "scent score" scalar value for each information item for each accessing user (scent scores will be discussed in more detail further below). The scent score scalar value may be increased by various activities taken by the user. For example, an accessed object's scent score associated with a particular individual may be incremented each time the user accesses the object. Further, other activities such as a user storing the object's location by means of a bookmark file or other similar utility may be used to further enhance its scent score for that user. The scent scores for all objects may be decayed as a function of elapsed time and their current values. This decay may follow any desired function, and may take the form of a linear degradation, half-life type degradation, or any other suitable form of degradation. Second, each accessed information item is associated with a second scent score scalar value for each accessing person. The same increasing and decaying operations are applied as were for the first scent score, except that the increasing and decaying are performed in smaller amounts. For purposes of this description, the first scent score may be thought of as a short-term scent score because it is subject to greater fluctuation from recent activities than the second scent score, which may be thought of as a long-term scent score. Although two scent scores are utilized for this description, the number and type of scent scores generated for a particular embodiment may vary depending on the specific application. Third, a linkage value is assigned for various pairs of items accessed. This value is determined based on factors such as sequential access patterns of individual users, user-determined groupings of accessed items such as placement of items into a collection such as a folder, items themselves including reference to the other, associated item, and both items being referenced by a third item. Fourth, the first and second scent scores from items accessed by a user are propagated to related items according to the linkage values which act as weights, linking various items by degree of similarity. Fifth, match scores for pairs of individuals are obtained using the correspondence between their scent score scalar values. Sixth, the scent scores for each item may be decayed and removed from long-term storage when the scent scores have become sufficiently small.

The present invention preferably operates on the Internet, where users access information items such as World Wide Web pages available from a virtually unlimited number of sources. However, it may also reside on smaller networks such as corporate intranets, or within a particular website, or it may be used in conjunction with an item checkout system such as are commonly used in libraries, stores, or other facilities.

A general overview of the major components of the present invention is shown in FIG. 1. The system includes an activity monitor 100, an entry processor 102, a match database 104, and a matcher 106. A match server 108 provides a system through which a variety of users 110 may interface with the match database 104 in order to determine those with interests similar to theirs. The activity monitor 100 is used to track the activities of the plurality of users 110 as they access various information resources available through the system. Its primary function is to collect information about user activities, for example their web-browsing sessions and their organization of particular items on their computer desktop, in bookmark files, and in folders. Depending on the needs of a particular system, the activity monitor 100 may be centralized so that all access requests must pass through it, or it may be distributed so that each user's system tracks the user's activity locally, or the activity monitor 100 may be a hybrid mixture. The activity monitor 100 provides user activity information to the entry processor 102, which receives the information and selects portions that are relevant for matching user interests. The entry processor 102 then inserts the relevant items into the match database 104 and maintains consistency between the new, incoming information, and the older, previously stored information. The entry processor 102 creates scent scores in the match database 104 corresponding to items that have been accessed and also provides linkage information between items that have been accessed. This information is inferred by user activities and includes such factors as time delays between the user's access of each information item in a series of information items. The matcher 106 interacts with the match database 104 and its activities may be summarized as follows: (1) it receives a measure of similarity and scent scores and diffuses them to other items in the user history in proportion to the measure of similarity, and it (2) correlates the scent scores of all of the particular items in the user history to determine users with common interests (the scent score, decay, linkage, scent score diffusion, and scent match score generation will be discussed in detail further below). As previously stated, the match server 108 provides a means of interface for the plurality of users 110 that enables them to access information about their similarity to other users. The exact user interface may vary from application to application and may take forms such as lists of users with similar interests or a graphical interface with spatial relationships indicating degrees of user similarity. Additionally, the user interface may allow a particular user to determine the similarity of any user to any other user. Further, FIG. 1 demonstrates a message server 112, which may be provided to allow interaction between users. In general, users 110 utilize the system to identify others having common interests and information resources that may be of interest. With the message server 112, users may also contact each other to discuss items of interest or for other purposes.

The residence of the various components of the present invention may be chosen as necessary for a particular application. For example, the activity monitor 100 and the entry processor 102 may be designed to reside on the client computer of a user 110 in such forms as an independent software application or an Internet browser plug-in, or may alternately reside on a proxy machine along with other components of the system. Thus, each user may have an activity monitor and an entry processor resident on their system. Alternately, other hybrid configurations may be developed. The exact configuration of the system components may be selected to meet the needs of a specific use, and is not intended to be limited to the specific embodiments described herein.

It is important to note that user activities, for purposes of the present invention, include any information gathering, storing, or organizing activity undertaken by a user and accessible by the activity monitor 100. A few of these activities, as mentioned before, include a user's web-browsing activity and their organization of items on their computer desktop or into files. The list of possible activities that may be beneficially monitored is expansive, and is certain to develop as different methods of information organization arise. Thus, the specific method of organization is not critical for the present invention.

Next, a more detailed discussion of scent score generation and decay, linkage generation, scent score diffusion, and scent match score generation is presented.

(1) Scent Score Generation and Decay

A simple model of the relevance of each object accessed to an individual user's interests is established by associating two unique scalar values to each item accessed by each user. These scalar values are referred to as a user's "scent score" for a particular item because they are intended to emulate trails left behind as a user travels through an information space. When a given entry is processed, a database entry is made which associates the item and user with two scalar values, a first scent score, termed a long-term scent score (SL) and a second scent score, termed a short-term scent score (SS).

If an entry already exists for the given item and use pair, then the two scent scores are updated as follows:

$$SL=SL+(1-SL)*KL$$

$$SS=SS+(1-SS)*KS$$

Where KS and KL are chosen as either constants or may be equations such that KS>KL. This causes the value of SS to rise faster than the value of SL. Other update schemes are also possible so long as the scent score scalars for a user at a given item increase to some degree with each time the user visits a given item and are subject to a certain limit to the total amount of the increase over time.

If an entry does not already exist for the given item and user pair, then a new entry is created, and initial values of SL and SS are established as follows, with CL and CS representing constant initial values for SL and SS:

$$SL=CL$$

$$SS=CS$$

A similar procedure may be performed for each entry in a bookmark file, with the only difference being that a larger value may be used for the constants KL and KS in order to signify a greater level of significance to items that have been saved as bookmarks as opposed to merely having been visited. Similarly, different values may be assigned to other information organizing activities such as the arrangement of items on a computer desktop or the downloading of files from a site. Further, although two types of scent scores have been discussed herein, the number of types of scent scores utilized may be selected for optimal performance for a particular embodiment.

While the scent score associated with a user at a web page increases with each visit, it also decreases over time. This decay prevents all items from ultimately moving to the maximum scent score intensity level. It also allows the scent score information to better reflect recent user interests. Just as the long-term scent score increases more slowly than the short-term scent score, long-term scent score also decays more slowly than short-term scent score. The periodic update is established as follows:

$$SL=SL*DL$$

$$SS=SS*DS$$

Where DS and DL are chosen as either constants or may be equations such that DS<DL. This causes the SL values to decay more slowly than the SS values. In general, logs are acquired over time, with time-stamped entries. Therefore, the decay function can be performed at regular intervals in accord with times of log entries. However, the decay function is optimally performed after one or two scent score propagation steps have been performed, as will be further described. It is important to note that various decay schemes may be used depending on the requirements of a specific application.

(2) Linkage Generation

The linkage is a measure of similarity between different web pages. This measure is generated to capture the notion that a user's interest in one item should be reflected in related items. One means by which this may be accomplished is to consider the sequence of items visited by a user as an indicator of similarity. Thus, if a user accesses one item and then another item within a short period of time, a linkage association may be established between the two items. This method is driven by the idea that people tend to follow a line of thought and that their interest in a particular topic will be present over a period of time during a given information gathering session. The degree of linkage established by this means may be either a constant within a fixed time threshold, or it may be made as a function of time between access events. Other means, for example using groupings established from user bookmarks, may be used. In this case, if several item references have been placed within a common bookmark folder, then these items may all be associated with one another. Alternately, a single new reference may be created to represent the folder itself, and all items within the folder may be linked to the folder reference. Another means for identifying item similarity is by reviewing the links to other items contained in an item. In essence, any item can be said to have some degree of similarity to any item that it references. Conversely, any item that is referenced by other items can be said to have some degree of similarity to the items that reference it. By using search engines, indexes, or other information sources that may be found on a network or on the Internet, it is possible to obtain a list of items that reference a given item. This method is used to find items that reference a item that has been accessed by a particular user. There are many other methods by which similarity may be determined. For example, in Internet search engines, similarity is determined by factors such as common occurrences of various keywords within text documents, by the titles of links within a page, and by the filenames of graphics and other files associated with a page. Any such method may be applied in order to determine and update the similarity measure between items.

In the case where sequential access to items is used in the generation of a linkage measure, the measure is determined using an associative reinforcement algorithm. Each time two items, A and B, are accessed in proximity to one another, the linkage measure $L_{AB}$ is updated, where $L'_{AB}$ is the updated linkage measure, as follows:

$$L'_{AB}=L'_{AB}+(1-L_{AB})*k(t)$$

where k(t)<1.

The value of k(t) is the incremental update factor for associating item A to item B where t represents the time that has elapsed between a user accessing item A and then item B. In general, the value of k(t) decreases as the value of t increases from zero. Also, for each forward association created from item A to item B, a reverse association from item B to A may be created as follows, where L'BA is the updated association value:

$$L'_{BA}=L_{BA}+(1-L_{BA})*\alpha k(t)$$

where k(t)<1
and α<1

In general, this reverse association will be made weaker than the forward association by use of a value of a that is less than one. A result is that the similarity measure between any two items will not necessarily be symmetric.

When other methods for determining similarity between items are used, they are combined with the similarity measure obtained from sequential access. In this case, a similar form of reinforcement update is used, except that the update factor k(t) is replaced with a value β*S where S is the similarity measure calculated by whatever means chosen, and β is a constant used to indicate the significance of the source of the measure. For example, β will be larger for similarities obtained from user bookmark folder groupings than for similarities obtained from references contained in documents.

(3) Scent Score Diffusion

Scent scores are dispersed from items a user has visited to other similar items through diffusion and decay processes. The diffusion process uses the web page similarity measures as a means to determine which pages are adjacent. Given a user's scent score with intensity $SS_A$ and $SL_A$ at item A, and intensity $SS_B$ and $SL_B$ at item B, then the proximity from item A to item B, $P_{AB}$ is used to update the user's scent score at item B as follows, where the prime symbol "'" indicates the updated value:

if $SS_A>SS_B:SS'_B=SS_B+(SS_A-SS_B)*L_{AB}*r$ if $SL_A>SL_B:SL'_B=SL_B+(SL_A-SL_B)*L_{AB}*r$

Where the term r is used to determine the general rate of diffusion. In some cases it may be desirable to make the value of r different for short-term and long-term scent score intensity values. For example, making the value of r larger for short-term scent scores than for long-term scent scores would allow the short-term scent score values to propagate faster than long-term scent score values. In all cases, r must be less than or equal to 1.

An important condition that must be satisfied before propagating any scent score values from item A to item B is the number of items that have been identified as similar to item A and the number of unique user scent scores that already exist at item A. If the product of these two quantities is greater than a chosen threshold value, then no scent score will be propagated from item A. This is done to create a model wherein some items act as a sink for scent scores. Scent score sinks are generally information sources which are very generic or which serve as gateway/portal sites such as major search engines, corporate home pages and the like which many users have visited and from which little useful interest-related information may be derived.

(4) Scent Match Score Generation

With each user having both long-term and short-term scent scores associated with various items, the next step is to compute scent match scores for each pair of users. Scent match scores can be obtained by comparing the short-term scent scores of two users, the long-term scent scores of two users, or the short-term scent scores of one user against the long-term scent scores of another. The scent match scores are obtained through the equations below:

$$SS\_Match_{ab} = \frac{\sum_p \frac{SS_{ap} \times SS_{bp}}{Stot_p}}{\sqrt{\sum_p SS_{ap}^2} \times \sqrt{\sum_p SS_{bp}^2}}$$

$$SL\_Match_{ab} = \frac{\sum_p \frac{SS_{ap} \times SL_{bp}}{Stot_p}}{\sqrt{\sum_p SS_{ap}^2} \times \sqrt{\sum_p SL_{bp}^2}}$$

$$LL\_Match_{ab} = \frac{\sum_p \frac{SL_{ap} \times SL_{bp}}{Stot_p}}{\sqrt{\sum_p SL_{ap}^2} \times \sqrt{\sum_p SL_{bp}^2}}$$

Where:
  SS_Match$_{ab}$ is the match between short-term scent scores of users a and b;
  SL_Match$_{ab}$ is the match between the short-term scent score of user a and the long-term scent score of user b;
  LL_Match$_{ab}$ is the match between the long-term scent scores of users a and b;
  Stot$_p$ is the total number of distinct user scent scores that can be found at item p;
  SS$_{ap}$ is the short-term scent score scalar assigned to user a at item p; and
  SL$_{ap}$ is the long-term scent score scalar assigned to user a at item p.

The above calculations are comparable to treating each user's scent score pattern as a very high-dimensional vector, and finding the cosine of the angle between each vector to pair. The one distinction, however, is that the division by Stot$_p$ in the numerator sum provides a discount factor for scent scores that occur at items that are accessed by many users. This discounting prevents items that are relatively unrelated to any specific user interests from being counted in the match score.

Although this method of correlation has been found useful in the context of the present invention, other correlation schemes may be used depending on the needs of the particular application and the preferences of the particular designer.

Once user matches are computed and stored in the match database 102, users may access these results to locate potential collaborators. In the preferred implementation, a match server 104 is used to provide multiple users access to the match database 102. The match server 104 uses a user's login name or an Internet protocol (IP) address of the requesting user's machine in order to identify the user within the match database 102. From the scent match scores computed for the requesting user, those with the highest values are used to select a set of potential collaborators. In order to understand why a certain individual has been identified as a potential collaborator, the user may examine any given candidate that is presented to find information on (1) the items that both users have visited; (2) the items that the other user has visited that the requesting user has not, but which are close to the interests of the requesting user; (3) the items that the requesting user has visited but that the other has not, but which are close to the other user's apparent interests; and (4) items which neither user has visited, but which are close to the apparent interests of both users.

Finally, a pruning operation may be performed in order to keep the match database 102 from growing to an unmanageable size. In this operation, entries that have little value for matching are eliminated by pruning all entries where user scent scores fall below a certain threshold value due to decay.

Figure 2:
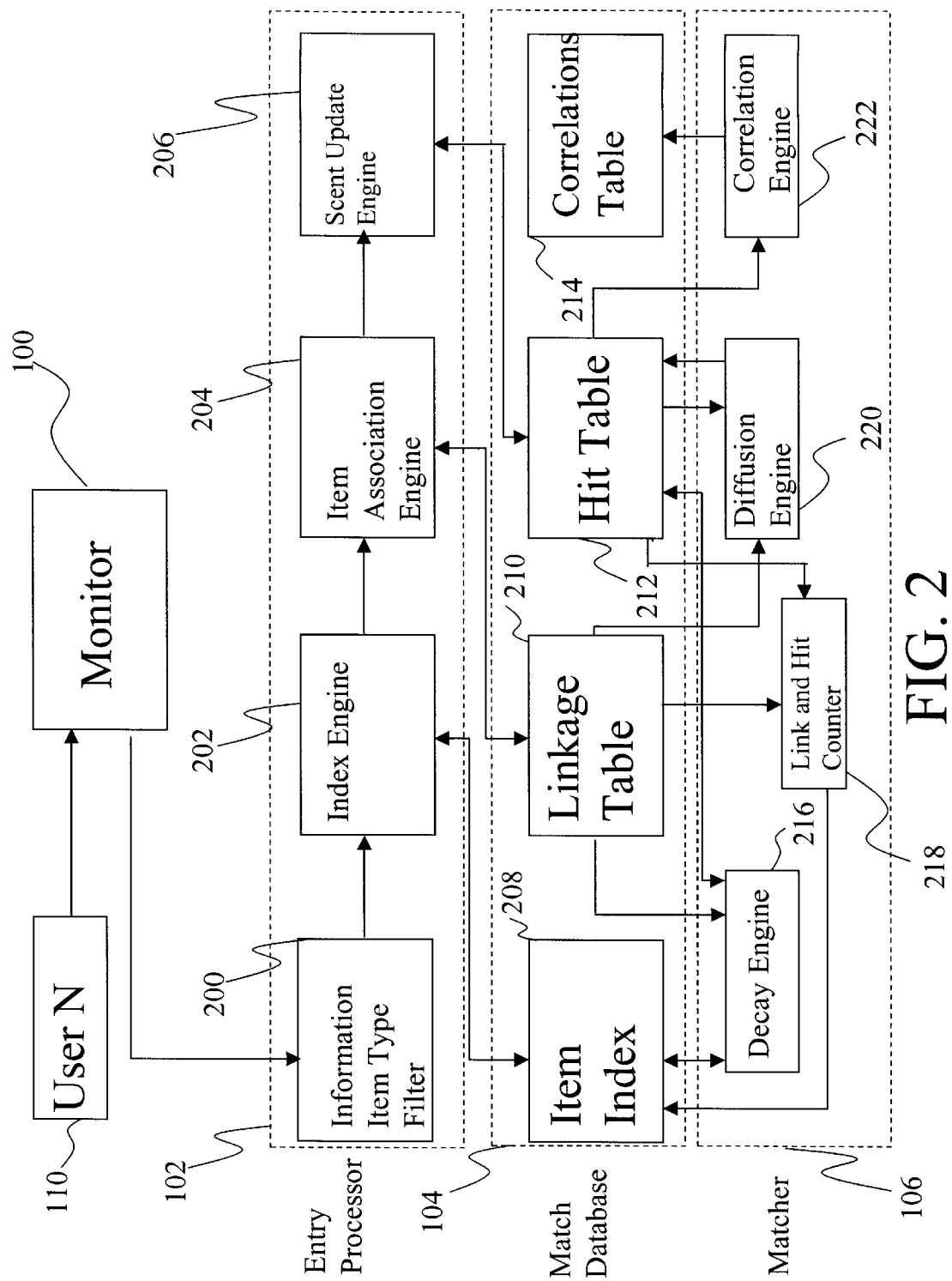
FIG. 2 provides a system detail of an embodiment of the present invention demonstrating the components of the entry processor, the match database, and the matcher.

More detail of the entry processor 102, the match database 104, and the matcher 106 are given in FIG. 2. The entry processor 102 includes an information item type filter 200, an index engine 202, an item association engine 204, and a scent update engine 206. The match database 104 includes an item index 208, a linkage table 210, a hit table 212, and a correlations table 214. The matcher 106 includes a decay engine 216, a link and hit counter 218, a diffusion engine 220, and a correlations engine 222. The information item type filter 200 receives incoming information about user activities from the activity monitor 100, including user identification information, an item identifier, a time code, and may include additional information useful for determining user interests. It then examines the item identifier to determine the type of item or the source of the item. It filters the items based on a particular criteria chosen to filter out unwanted information items. For example, it may filter by eliminating files of a particular type from a particular host or by allowing only certain file types to pass. The information item type filter 200 serves as a means for including only information sources of a desired type and acts by either accepting or rejecting particular items.

When the information item type filter 200 accepts an information item, it passes the information gathered to the index engine 202, which interacts with the item index 208 of the match database 104 to create a new index entry for the item if it was not previously indexed or updates the index entry if the item was previously indexed. The index engine 202 assigns each new information item a unique identifier. The item association engine 204 receives information about user activities from the index engine 202 and examines the sequence of a user's access to information items. It generates linkages between pairs of items that are accessed during a relatively short period of time. Preferably, the item association engine 204 maintains a relatively short-term memory and stores the last two to three items a user has accessed. It examines the time between the current and the last few information item accesses. If the time has been sufficiently short, the item association engine 204 will create an association, in the form of a source item identifier and a destination identifier in the linkage table 210 of the match database 104. Each of the items in order within the sequence is assigned a certain linkage strength. Item pairs out of order within the sequence are assigned a weaker strength. For example, if three information sources A, B, and C have been accessed in that order, linkages are created for B to C and A to B with a certain linkage strength. Linkages may also be created for A to C, but with a weaker linkage strength. Although a two to three item storage is preferable, any number of items may be stored and linkages determined for them by this method. In addition to forward linkages just described, reverse linkages may also be made, such as C to B, B to A, and C to A and assigned strengths as desired.

The scent update engine 206 receives information from the item association engine 204 and updates the hit table 212 of the match database 104, assigning particular scent scores to a particular information source for a particular user 110. If the particular user 110 has not accessed the particular information source before, the scent update engine 206 creates new scent score entries for that user 110 for the particular information source. Typically, the scent score entries include scent scores, user identification, a time stamp of the last hit on the item by the particular user 110, and an information item identifier, among other pieces of information. If the particular user 110 has previously visited the information source, the time stamp and scent scores are updated. As discussed previously, the long-term scent score is incremented upward at a slower rate than the short-term scent score, causing the short-term scent score to be more sensitive to recent activities.

The tables included in the match database 104 include a item index 208, a linkage table 210, a hit table 212, and a correlations table 214, and are displayed in FIGS. 3, 4, 5, and 6, respectively. The item index 208, as shown in FIG. 3 includes a unique item identifier, the source address for the item, the total number of visitors who have accessed the item, the number of scent score entries in the database for the item, the number of links from the item, the forward scan status, and the backward scan status. The forward scan status and the backward scan status are generally methods of looking at information resources which refer to a given information source, or which the given information source refers to. Forward scanning involves examining the information sources targeted by links in the information source at hand. In this context, links may be items such as hyperlinks in a web page or bibliographic information in a particular document. Reverse scanning involves utilizing information organization resources such as search engines on the World Wide Web to find information resources that refer to the information resource at hand. By viewing information sources related by links to the information source at hand, it is possible to determine other potential information sources of interest to a given user 110. The forward scan status and backward scan status are established by a forward scanner and a reverse scanner, respectively, and are shown in the context of the present invention in FIG. 7. The entries for forward scan status and backward scan status may include the time stamp of the last scan or may simply indicate that scanning has taken place. The scanning process may take place only once after a item has been visited, or it may take place at specified intervals. Furthermore, the scanning processes may be utilized both with items that have actually been visited or it may extend to items not yet visited, but which have accumulated a scent score. The actual extent and timing of the scanning processes may be tailored to the particular application. The information gathered from the scanning process is used to update the linkage table.

The linkage table 210 is shown in FIG. 4, and contains information including source item identification, destination item identification, and a linkage value for each item pair. The hit table 212 is shown in FIG. 5, and includes the user identification, the unique item identification, the time stamp of the last access event at that item, the short-term scent score for that item, and the long-term scent score for that item. The correlations table 214 is shown in FIG. 6, and includes the user identification for a first particular user, shown as "User ID X", the user identification for a second particular user, shown as "User ID Y", the short-term scent match score between the users, the long-term scent match score between the users, and the long-term scent score to short-term scent score match between the users. Referring back to FIG. 2, the decay engine 216 of the matcher 106 operates by periodically decaying the entries in the item index 208, the linkage table 210, and the hit table 212. In the linkage table 210, each linkage value is also decayed. As discussed, this reduction may be by a specific percentage, a scalar value, or by other methods depending on the needs of the particular application. The decay engine 216 operates much the same way on the hit table 212, reducing the short-term scent score and the long-term scent score. The particular reduction method or degree may vary for each of the items to be reduced, i.e. may be different for the decay of the short-term scent score than it is for the decay of the long-term scent score. If a short-term scent score or long-term scent score for a particular user corresponding to a particular item on the hit table 212 becomes decayed below a threshold value, the decay engine 216 may remove its entry in the hit table 212. If all scores for a particular item for all users on the hit table 212 become decayed below thethreshold, the decay engine 216 may prune its entry from the item index 208, and may also prune entries that incorporate it in the linkage table 210. In operation, the decay engine is not critical. However, it serves a cleanup function in order to eliminate unnecessary entries from the match database 104, to streamline the database size.

The link and hit counter 218 of the matcher 106 provides a counting mechanism for each information item listed in the item index 208. It searches the linkage table 210 to determine the number of links from each item, and searches the hit table 212 to determine the number of users 110 who have visited a particular information source. The link and hit counter 218 provides a summary statistic in the item index 208 in order to keep track of the total number of users 110 who have visited the particular information item. The link and hit counter 218 also examines the hit table 212 to determine the total number of scent scores for each information item and provides the total in the item index 208.

The diffusion engine 220 of the matcher 106 propagates the long-term scent scores and the short-term scent scores for a particular user from the hit table 212 to items that may be considered similar, via the linkage entries in the linkage table 210 by the method previously discussed for scent score diffusion. Entries for items to which the scent scores have been diffused are then either added to the hit table 212 or, if they already exist, are modified with their corresponding scent score values. The hit table 212 will not, however, register a time of last hit for the information items to which scent scores have propagated for a particular user 110, but which have not yet been visited by that particular user 110. In this way, information sources that have actually been visited by a particular user 100 may be distinguished from those that have not. Preferably, the diffusion engine 220 includes criteria that will prevent it from diffusing scent scores to certain items and item types. The criteria are necessary to prevent diffusion of scent scores to irrelevant information sources. For example, as discussed, it is undesirable to diffuse the scent scores through popular or general web pages, such as major corporate homepages or search engines, which have large traffic volumes, but which are not particularly useful for matching peoples' interests. The criteria for exclusion of certain information sources from the diffusion process may be set by examining variables for a particular item, such as the scent scores and the number of links to or from the item.

The correlation engine 222 of the matcher 106 correlates the scent scores from the hit table 212 for pairs of users 110 and determines and updates the short-term match scores, the long-term match scores, and the long-term to short-term match scores for each pair of users.

With regard to the system of FIG. 2 and the tables of FIGS. 3, 4, 5, and 6, it is important to note that many configurations may be developed utilizing the same general components. For example, the elements that comprise the entry processor 102, the match database 104, and the matcher 106 are somewhat arbitrarily grouped for clarity of explanation. In a particular embodiment, the grouping of elements may be much different than that presented in the drawings and described without having an appreciable effect on the system's functionality. More specifically, for example, the tables of the database 104 may be constructed such that the information collected is grouped differently among the tables. The importance lies in their use, not their specific embodiment, as the construction of the database will vary depending on such factors as the software used, the particular application, and the database developer. Similar variations are both possible and likely for other components, including those presented in FIG. 7.

Figure 7:
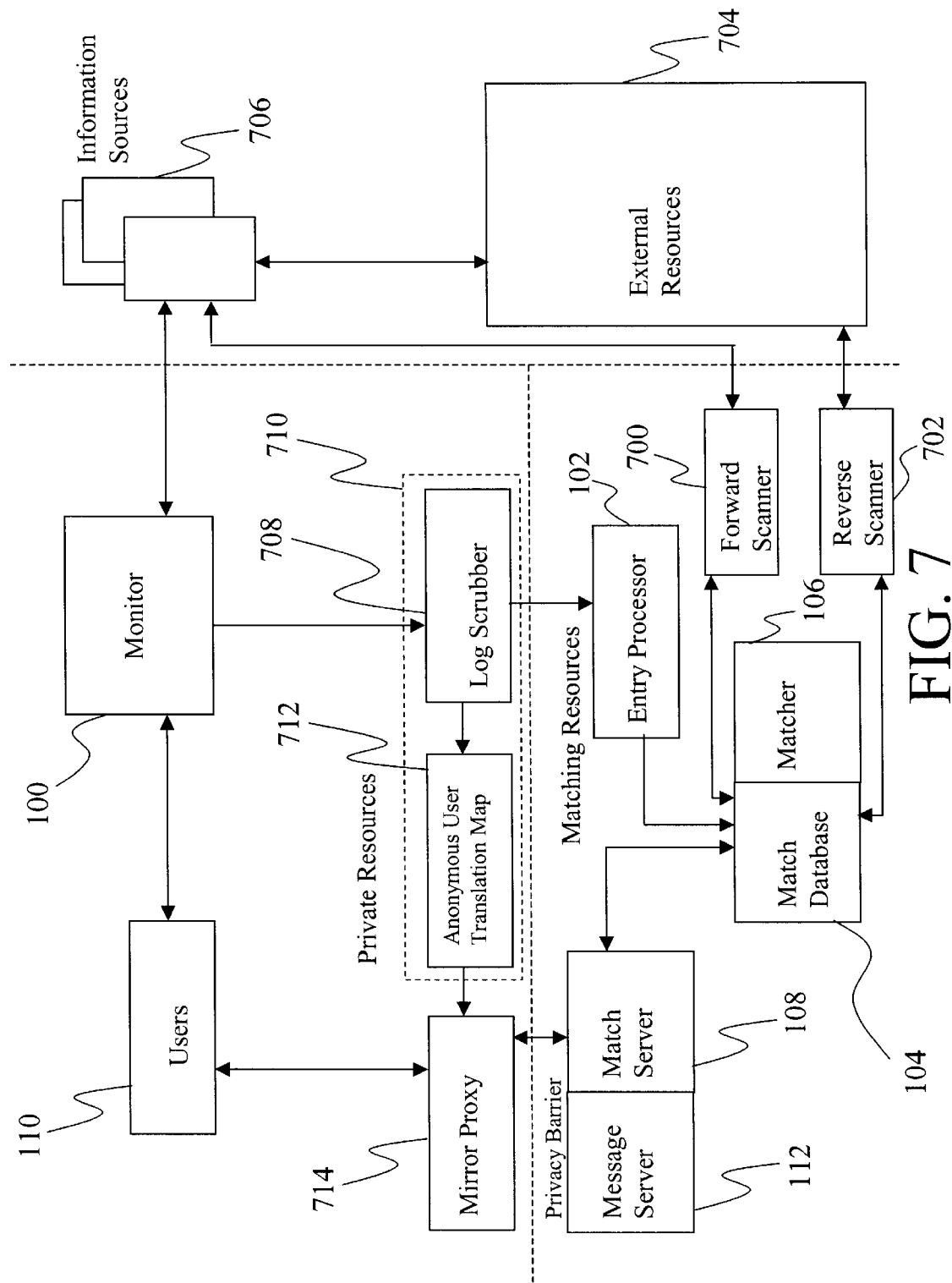
FIG. 7 is a system overview illustrating forward and backward scanning, privacy enhancements to enable users to maintain anonymity, and the system's relationship with external resources.

FIG. 7 provides a diagram of the system of the present invention that includes privacy enhancements to allow users 110 to remain anonymous. The activity monitor 100, the entry processor 102, the match database 104, the matcher 106, the match server 108, and the message server 112 are all elements shown in FIG. 1 and FIG. 2, which have been previously described. FIG. 7 also shows the interaction of the forward scanner 700 and the reverse scanner 702 with the match database 104. The forward scanner 700 examines the contents of information sources 706 to determine information sources to which they refer. In the case of the World Wide Web, for example, this process may take the form of following links that exist in the contents of a particular web page and distributing scent scores to their associated web pages. The reverse scanner 702 gathers information from external resources 704 such as search engines, indexes, and other resources that provide information about and organize information resources that include references to the information resource at hand. As discussed previously, information gathered through the forward scanner 700 and the reverse scanner 702 is used to diffuse the scent scores from information sources actually visited to information sources not yet visited, but which may contain information of interest. The forward scanner 700 and reverse scanner 702 are not critical components, but rather, are designed to enhance the diffusion process, and may be incorporated jointly or individually.

The privacy enhancements 708 include a log scrubber 710 and an anonymous user translation map 712. The log scrubber 710 removes the identity of the user 110 and replaces it with an arbitrary or anonymous name. The anonymous user translation map 712 provides a means for keeping track of the arbitrary or anonymous name associated with a particular user 110. The log scrubber 710 utilizes the anonymous user translation map 712 to determine whether a user 110 has previously been given an anonymous name, and if so it utilizes the same anonymous name for the current session. If the user 110 has not previously been given an anonymous name, a new one is generated and stored in the anonymous user translation map 712. The mirror proxy 714 acts as an information server, such as a Web server. However, when a user accesses the mirror proxy 714, it obtains their identification, finds the corresponding anonymous identification entry in the anonymous user translation map, queries the match server 108 with the anonymous identification, and returns the results to the user. In other words, when a user has entered a request, the request is translated into a request containing the user's anonymous identification in place of their actual identification, and the results of the request are returned to the user. Note that the message server 112 is accessed through the match server 108, thus allowing for anonymous messaging between users 110. Thus, users of the system can locate other users with similar interests, may exchange information, but need not reveal their true identity unless so desired.

Figure 8:
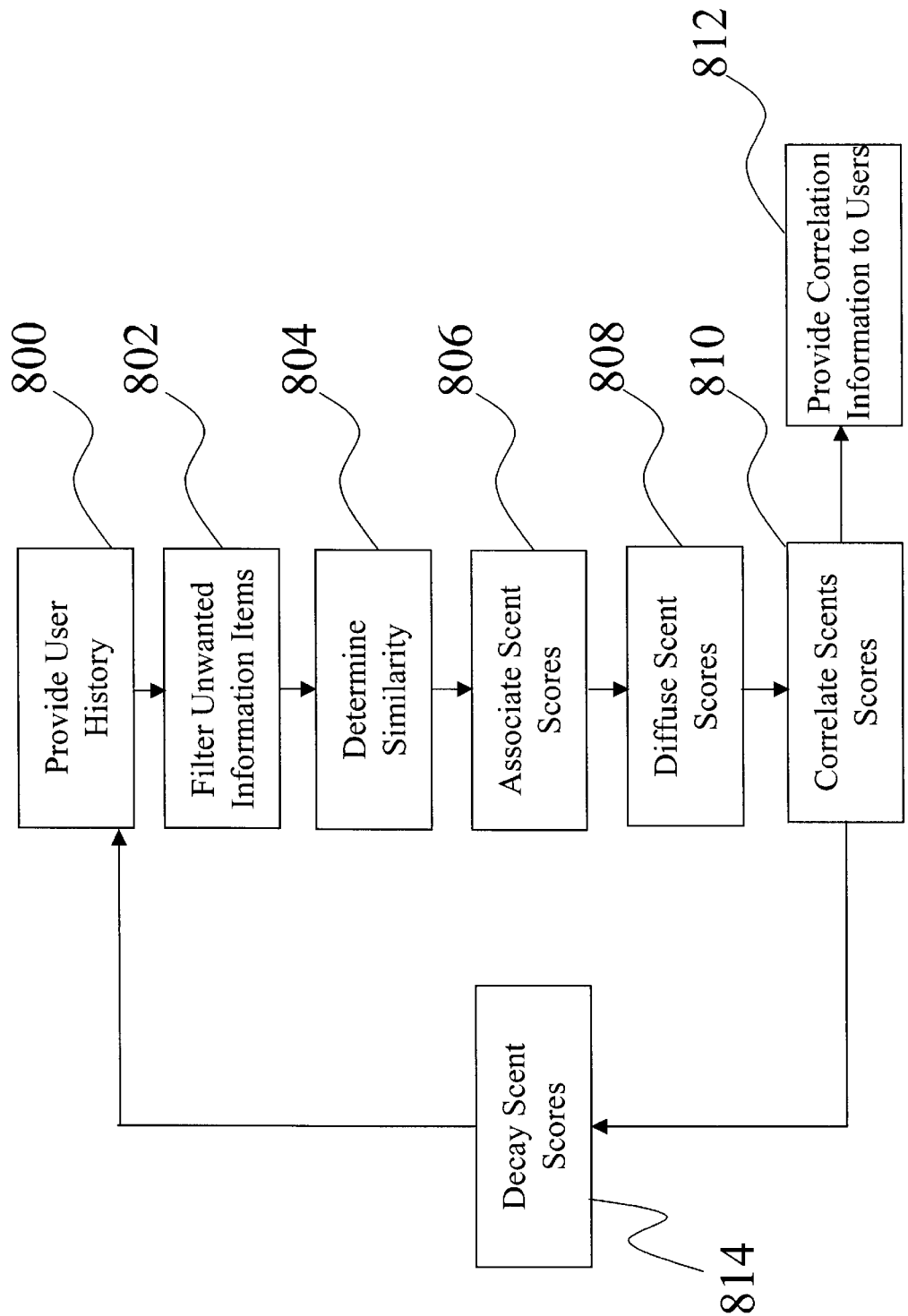
FIG. 8 is a flow chart generally representing the steps of the present invention.

FIG. 8 is a flow chart generally outlining the steps provided by the present invention. As shown in the diagram, and as discussed relative to the system shown in FIGS. 1, 2, and 7, the first step is to provide a user history as shown by box 800. The information for the user history may consist of historical data about the interaction of a plurality of users with a plurality of information items or it may be generated through real-time user interaction with an information resource such as the World Wide Web. The next step is to filter the information items in the user history in order to eliminate those that are unlikely to provide useful information for collaborator discovery, as represented by box 802. These items, as mentioned previously, include items which are likely to be accessed by a broad base of people regardless of any common interests. Examples of items that fit into this category include major search engines on the Internet and major newspapers, magazines, or other publications in the case of a library system utilizing the present invention. The next step is to determine a similarity measure of the information items accessed, as shown by box 804. The similarity measure, as discussed previously, may be developed by a number of means such as the proximity of user accesses of several information items, user organization activities such as bookmarking web pages in a browser bookmark file and arranging items on the desktop of a computer, content analysis of information items, and express user similarity ratings. After generating similarity measures between information items, scent scores are associated between each particular information item and each user accessing the particular information item. The scent score association is represented by box 806. Next, utilizing the scent scores and the similarity measure between information items, the scent scores are diffused, or propagated, to other information items by generating a diffused scent score, derived from the scent score at the item from which the scent is to be diffused and the measure of similarity, and applying the derived scent score to the existing scent score of the item to which the scent score is diffused. The diffusion process is represented by box 808. After the diffusion process, the scent scores for all information items for all users are correlated in order to determine users who potentially share common interests, as represented by box 810. As shown by box 812, the results of the correlation may be provided to the users in order to assist them in finding collaborators. After correlation of the scent scores and extraction of relevant information during a particular iteration of the steps, the scent scores are decayed, as shown by box 112. The decay, as discussed previously, may take place linearly by a fixed amount for each iteration, or it may be performed by other methods.

In accordance with the present invention, a specific embodiment has been developed using Microsoft Access97™, and is readily adaptable to other databases and database languages such as Dbase and SQL. The pertinent details of this embodiment are discussed below. It is important to note that the description and code below is presented for illustration and clarity, and that it focuses primarily on aspects of the invention that are best illustrated by example. Portions of the invention not described by the code are substantially as described in other areas of this specification. Reference numbers will also be provided so that the details of the embodiment may be keyed to FIGS. 1 to 7 and their respective descriptions.

Prior to the creation of a new entry in the hit table 212, a decay query is run to reduce the short-term and long-term scent scores. The decay query, as was discussed previously, may be run periodically at preset intervals, or may be triggered by particular events. The code of the decay query is as follows:

UPDATE DISTINCTROW hitTable AS H SET H.ST_Scent=[H].[ST_Scent]*0.5, H.LT_Scent=[H].[LT_Scent]*0.8;
where hitTable represents the hit table 212, ST_Scent represents the short-term scent score, and LT_Scent represents the long-term scent score. In this case, the short-term and long-term scents are decayed through multiplication by scalar values of 0.5 and 0.8, respectively.

Next, a new entry in the hit table 212 is created for the initial visit to a particular information item. The information for the hit table 212 is gathered from the activity monitor 100 and entered via the entry processor 102. After entries have been added, queries are performed to handle the diffusion and matching functions.

The following query is first performed to remove entries from the linkage table 210 for information sources that are linked to themselves.

DELETE DISTINCTROW L.SourcePageID FROM linkageTable AS L WHERE (((L.SourcePageID)=[L].[DestPageID]));

where linkageTable is the linkage table 210, SourcePageID is the Source Page Identification, and DestPageID is the Destination Page Identification.

After removing self-linked information sources from the linkage table 210, a first diffusion cycle is run. The code for the diffusion cycle includes several parts as follows:

SELECT Count(hitTable.LastHit) AS Visitors, hitTable.PageID, Count(hitTable.UserID) AS Scents INTO hitsPerPage FROM hitTable GROUP BY hitTable.PageID;

where hitTable is the hit table 212, LastHit is the Last Hit Time Stamp, PageID is the Page Identification, and UserID is the User Identification. The code counts the number of visitors to a particular information source and the number of users who have visited a particular information source. This information is stored in a temporary table, and then is transferred from the temporary table into the page index table 208 by the code below.

UPDATE DISTINCTROW hitsPerPage INNER JOIN pageIndex ON hitsPerPage.PageID=pageIndex.PageID SET pageIndex.Visitors=[hitsPerPage].[Visitors], pageIndex.Scents=[hitsPerPage].[Scents]

Next the linkage table 210 is updated by the following code. The results of the update are initially stored in a temporary table.

SELECT DISTINCTROW linkTable.SourcePageID, Count (linkTable.DestPageID) AS Linkages INTO LinkCount FROM linkTable GROUP BY linkTable.SourcePageID The results from the temporary table are then transferred into the page index table 208 by the code below.

UPDATE DISTINCTROW LinkCount INNER JOIN pageIndex ON LinkCount.SourcePageID=pageIndex.PageID SET pageIndex.Linkages=[LinkCount].[Linkages]

The actual diffusion step of the first diffusion cycle is performed by the next several portions of code. First, information sources that are linked to other information sources that have scent scores are collected.

SELECT S.UserID, L.DestPageID, S.ST_Scent, S.LT_Scent, L.Linkage, P.Scents INTO step1Table FROM (hitTable AS S INNER JOIN linkTable AS L ON S.PageID=L.SourcePageID) INNER JOIN pageIndex AS P ON S.PageID=P.PageID WHERE ((([P].[Scents]*[P].[Linkages])<40))

Next, scents of zero value are inserted as placeholders in the hit table 212 for information sources that are to receive scents through diffusion.

INSERT INTO hitTable (UserID, PageID, ST_Scent, LT_Scent) SELECT DISTINCT L.UserID, L.DestPageID, 0 AS Expr1, 0 AS Expr2 FROM step1Table AS L WHERE (((Exists (SELECT H2.PageID FROM hitTable AS H2 WHERE H2.PageID=L.DestPageID AND H2.UserID=L.UserID))=False))

Next, values are calculated for an intermediate table, named step2table, utilizing an approximation of the scent update formula described previously and represented by the following code.

SELECT DISTINCTROW S.UserID, S.DestPageID, Avg((([S].[ST_Scent]-[D].[ST_Scent])*[S].[Linkage]) AS ST_dev, Avg(([S].[LT_Scent]-[D].[LT_Scent])*[S].[Linkage]) AS LT_dev, Count(S.DestPageID) AS Sources, D.ST_Scent AS currentST, D.LT_Scent AS currentLT, (1-([Sources]*[ST_dev])+(([Sources]-1)*[Sources]*[ST_dev]*[ST_dev]/2))* ([currentST]-1)+1 AS ST_new, (1-([Sources]*[LT_dev])+(([Sources]-1)*[Sources]*[LT_dev]*[LT_dev]/2))*([currentLT]-1)+1 AS LT_new INTO step2Table FROM step1Table AS S INNER JOIN hitTable AS D ON (S.DestPageID=D.PageID) AND (S.UserID=D.UserID) WHERE (((S.Scents)>0) AND ((S.LT_Scent)>[D].[LT_Scent])) GROUP BY S.UserID, S.DestPageID, D.ST_Scent, D.LT_Scent Next, the results from the intermediate step2table are transferred into the hit table 212 by the following code.

UPDATE DISTINCTROW hitTable AS H, step2Table AS new SET H.ST_Scent=[new].[ST_new], H.LT_Scent=[new].[LT_new] WHERE (((H.UserID)=[new].[UserID]) AND ((H.PageID)=[new].[DestPageID]))

The code steps above complete the first diffusion cycle. Subsequently, a second diffusion cycle is performed by several steps, which are set forth below, along with the appropriate code for each. As in the first diffusion cycle, the code below counts the number of visitors to a particular information source and the number of users who have visited a particular information source.

SELECT Count(hitTable.LastHit) AS Visitors, hitTable.PageID, Count(hitTable.UserID) AS Scents INTO hitsPerPage FROM hitTable GROUP BY hitTable.PageID The information just obtained is stored in a temporary table, and then is transferred from the temporary table into the page index table 208 by the code below.

UPDATE DISTINCTROW hitsPerPage INNER JOIN pageIndex ON hitsPerPage.PageID=pageIndex.PageID SET pageIndex.Visitors=[hitsPerPage].[Visitors], pageIndex.Scents=[hitsPerPage].[Scents]

The actual diffusion step of the second diffusion cycle is performed by the next several portions of code. First, information sources that are linked to other information sources that have scent scores are collected.

SELECT S.UserID, L.DestPageID, S.ST_Scent, S.LT_Scent, L.Linkage, P.Scents INTO step1Table FROM (hitTable AS S INNER JOIN linkTable AS L ON S.PageID=L.SourcePageID) INNER JOIN pageIndex AS P ON S.PageID=P.PageID WHERE ((([P].[Scents]*[P].[Linkages])<40))

Next, scents of zero value are inserted as placeholders in the hit table 212 for information sources that are to receive scents through diffusion.

INSERT INTO hitTable (UserID, PageID, ST_Scent, LT_Scent) SELECT DISTINCT L.UserID, L.DestPageID, 0 AS Expr1, 0 AS Expr2 FROM step1Table AS L WHERE (((Exists (SELECT H2.PageID FROM hitTable AS H2 WHERE H2.PageID=L.DestPageID AND H2.UserID=L.UserID))=False))

Next, values are calculated for an intermediate table, named step2table, utilizing an approximation of the scent update formula described previously and represented by the following code.

SELECT DISTINCTROW S.UserID, S.DestPageID, Avg(([S].[ST_Scent]-[D].[ST_Scent])*[S].[Linkage]) AS ST_dev, Avg(([S].[LT_Scent]-[D].[LT_Scent])*[S].[Linkage]) AS LT_dev, Count(S.DestPageID) AS Sources, D.ST_Scent AS currentST, D.LT_Scent AS currentLT, (1-([Sources]*[ST_dev])+(([Sources]-1)*[Sources]*[ST_dev]* [ST_dev]/2))*([currentST]-1)+1 AS ST_new, (1-([Sources]*[LT_dev])+(([Sources]-1)*[Sources]*[LT_dev]*[LT_dev]/2))*([currentLT]-1)+1 AS LT_new INTO step2Table FROM step1Table AS S INNER JOIN hitTable AS D ON (S.DestPageID=D.PageID) AND (S.UserID=D.UserID) WHERE (((S.Scents)>0) AND ((S.LT_Scent)>[D].[LT_Scent])) GROUP BY S.UserID, S.DestPageID, D.ST_Scent, D.LT_Scent Next, the results from the intermediate step2table are transferred into the hit table 212 by the following code.

UPDATE DISTINCTROW hitTable AS H, step2Table AS new SET H.ST_Scent=[new].[ST_new], H.LT_Scent=[new].[LT_new] WHERE (((H.UserID)=[new].[UserID]) AND ((H.PageID)=[new].[DestPageID]))

In order to correlate users to determine potential user matches based on interests, the following steps are performed in the specific embodiment.
(1) The hit counts are updated
(2) The dot product of each user's scents with each other user's scents is taken, utilizing the total number of scents at each information item as the divisor. This operation is generated by the following code.

SELECT T.UserID, S.UserID, Sum([T].[ST_Scent]*[S].[ST_Scent]/(P.Scents)) AS ST_Sum, Sum(T.LT_Scent*S.LT_Scent/(P.Scents)) AS LT_Sum, Sum(T.LT_Scent*S.ST_Scent/(P.Scents)) AS LT_ST INTO correlationsTable FROM hitTable AS T, hitTable AS S, pageIndex AS P WHERE (((T.PageID)=[S].[PageID] And (T.PageID)=[P].[PageID]) AND ((P.Scents)>0)) GROUP BY T.UserID, S.UserID (3) Next, normalizing terms for each user are determined in order to reduce the individual user's match if the individual user has many strong scents.

SELECT DISTINCTROW H.UserID, Sqr(Sum(H.ST_Scent*H.ST_Scent)+1) AS ST_norm, Sqr(Sum(H.LT_Scent*H.LT_Scent)+1) AS LT_norm INTO userNorms FROM hitTable AS H GROUP BY H.UserID (4) Next, the scores in the correlations table 214 are divided by a product of the user's norms for each pair of users in order to produce the final resulting user match scores. This operation is carried out by the following two code blocks.

SELECT A.S_UserID, A.T_UserID, A.ST_Sum/ST_norm AS ST, A.LT_Sum/LT_norm AS LT, A.LT_ST/LT_ST_norm AS LT_ST INTO norm4resultsTemp FROM correlationsTable AS A INNER JOIN correlX4 AS B ON (A.S_UserID=B.S_UserID) AND (A.T_UserID=B.T_UserID) WHERE (((A.T_UserID)<>[A].[S_UserID]));
correlX4: SELECT A.UserID AS S_UserID, B.UserID AS T_UserID, A.ST_norm*B.ST_norm AS ST_norm, A.LT_norm*B.LT_norm AS LT_norm, A.LT_norm*B.ST_norm AS LT_ST_norm FROM userNorms AS A, userNorms AS B.

The final match results are then available within the norm4resultsTemp table, from which they may be accessed by users.

What is claimed is:

1. A method for collaborator discovery among a plurality of users including the steps of:
  (a) providing a user history including a plurality of entries, with each entry including a user identity associated with each particular user and a reference to a particular item accessed by that user;
  (b) associating particular items in the user history by providing a measure of similarity between the particular items;
  (c) uniquely associating at least one scent score to each particular item accessed by a particular user;
  (d) diffusing the at least one scent score associated with a particular item accessed by a particular user to another item by generating at least one diffusion scent score from the combination of the measure of similarity between the particular item and the other item and the at least one scent score, and incorporating the at least one diffusion scent score into the at least one scent score of the other item;
(e) repeating step (d) for all items which have at least one scent score; and
(f) determining scent match scores by correlating the scent scores from all of the particular items to find users with common interests.

2. A method for collaborator discovery among a plurality of users as set forth in claim 1, wherein the user history is generated by monitoring and recording the real-time accesses of the plurality of users, and wherein steps (b) through (f) of claim 1 are repeated a plurality of times to provide a continual update of the scent scores.

3. A method for collaborator discovery among a plurality of users as set forth in claim 1, further including the step of filtering the items in the user history using a criteria to eliminate undesirable items from the user history.

4. A method for collaborator discovery among a plurality of users as set forth in claim 1, wherein the measure of similarity between the particular items associated in step (b) is based on the temporal proximity of access between the particular items.

5. A method for collaborator discovery among a plurality of users as set forth in claim 1, wherein the scent scores are represented by scalar values, and wherein a step of increasing the scent scores in proportion to the number of times a particular item is accessed by a particular user is added between steps (c) and (d).

6. A method for collaborator discovery among a plurality of users as set forth in claim 1, further including the step of providing each of the plurality of users with information regarding the correlation of their scent scores with the scent scores of others of the plurality of users after step (f).

7. A method for collaborator discovery among a plurality of users as set forth in claim 1, wherein the plurality of users are provided with anonymous identifications.

8. A method for collaborator discovery among a plurality of users as set forth in claim 1, wherein each of the plurality of users is provided a method for messaging to allow interaction between the plurality of users.

9. A method for collaborator discovery among a plurality of users as set forth in claim 2, wherein items accessed include Internet web pages.

10. A method for collaborator discovery among a plurality of users as set forth in claim 2, wherein the scent scores are decayed over time.

11. A method for collaborator discovery among a plurality of users as set forth in claim 2, wherein the at least one scent score for each particular user and information item includes a short-term scent score and a long-term scent score, and where, for each subsequent access of each particular item by a particular user, the short-term scent score and long-term scent score are increased in proportion to the number of accesses by the particular user such that the short-term scent score increases more rapidly than the long-term scent score.

12. A method for collaborator discovery among a plurality of users as set forth in claim 5, wherein a maximum scent score value is set such that when a particular scent score reaches the maximum scent score value, it ceases to increase.

13. A method for collaborator discovery among a plurality of users as set forth in claim 12, wherein the long-term scent scores and the short-term scent scores are decayed over time with a decay rate such that the long-term scent scores are decayed more slowly than the short-term scent scores.

14. A method for collaborator discovery among a plurality of users as set forth in claim 13,
a. wherein the short-term scent score and long-term scent scores are associated with each particular user according to the following, $$SS=CS$$

$$SL=CL$$

wherein SS represents the short-term scent score, SL represents the long-term scent score, and CS and CL are scalar values chosen as scent score values assigned for the first access of a particular item by a particular user;

b. wherein the short-term scent score and the long-term scent score are increased according to the following, $$SS=SS+(1-SS)*KS \text{ and}$$

$$SL=SL+(1-SL)*KL, \text{ wherein}$$

SS represents the short-term scent score, SL represents the long-term scent score, KS and KL represent incrementing rates chosen such that KS>KL;

c. wherein the decay is performed according to the following, $$SS=SS*DS \text{ and}$$

$$SL=SL*DL, \text{ wherein}$$

SS represents the short-term scent score, SL represents the long-term scent score, DS and DL represent decay rates chosen such that DS<DL.

15. A method for collaborator discovery among a plurality of users as set forth in claim 14, wherein the item from which the scent score is diffused is identified as a source item A and the item to which the scent score is diffused is identified as a destination item B, and the scent score diffusion is performed according to, $$\text{if } SS_A>SS_B:SS'_B=SS_B+(SS_A-SS_B)*L_{AB}*r_S, \text{ and}$$

$$\text{if } SL_A>SL_B:SL'_B=SL_B+(SL_A-SL_B)*L_{AB}*r_L, \text{ wherein}$$

$SS_A$ represents the short-term scent for a particular user at the source item A, $SS_B$ represents the short-term scent for a particular user at the destination item B, $SL_A$ represents the long-term scent for a particular user at the source item A, $SL_B$ represents the long-term scent for a particular user at the destination item B, $L_{AB}$ represents the measure of similarity between the source item A and the destination item B, $r_S$ provides a short-term scent diffusion rate, and $r_L$ provides a long-term scent diffusion rate.

16. A method for collaborator discovery among a plurality of users as set forth in claim 15, wherein the correlation of the scent scores between user a, representing a particular one of the plurality of users, and user b, representing another of the plurality of users, where item p represents a particular one of the plurality of items, is performed by the following, $$SS\_Match_{ab} = \frac{\sum_p \frac{SS_{ap} \times SS_{bp}}{Stot_p}}{\sqrt{\sum_p SS_{ap}^2} \sqrt{\sum_p SS_{bp}^2}},$$

$$SL\_Match_{ab} = \frac{\sum_p \frac{SS_{ap} \times SL_{bp}}{Stot_p}}{\sqrt{\sum_p SS_{ap}^2} \sqrt{\sum_p SL_{bp}^2}}, \text{ and}$$

$$LL\_Match_{ab} = \frac{\sum_p \frac{SL_{ap} \times SL_{bp}}{Stot_p}}{\sqrt{\sum_p SL_{ap}^2} \sqrt{\sum_p SL_{bp}^2}}, \text{ where}$$

SS__Match$_{ab}$ is the match between short-term scent scores of user a and user b;

SL__Match$_{ab}$ is the match between the short-term scent score of user a and the long-term scent score of user b;

LL__Match$_{ab}$ is the match between the long-term scent scores of users a and b;

Stot$_p$ is the total number of distinct user scent scores that can be found at item p;

SS$_{ap}$ is the short-term scent score assigned to user a at item p; and

SL$_{ap}$ is the long-term scent score assigned to user a at item p.

17. A system for collaborator discovery among a plurality of users including:
   a. an activity monitor which provides a user history, said user history including a plurality of entries, with the plurality of entries including a user identity associated with each particular user and a reference to a particular item accessed by that user;
   b. an entry processor connected to the activity monitor to receive the plurality of entries of the user history from the activity monitor, said entry processor operative to associate pairs of particular items in the user history to provide a measure of similarity for each pair of particular items, and to uniquely associate at least one scent score for each particular item accessed by a particular user;
   c. a match database connected to the entry processor to receive and store the measure of similarity and the at least one scent score;
   d. a matcher connected to the match database to receive the measure of similarity and the at least one scent score, and to diffuse the at least one scent score to other particular items in the user history in proportion to the measure of similarity and to correlate the scent scores of all of the particular items in the user history to determine users with common interests.

18. A system for collaborator discovery among a plurality of users as set forth in claim 17, wherein the user history provided by the activity monitor is generated from information regarding the real-time activities of users with respect to a plurality of items.

19. A system for collaborator discovery among a plurality of users as set forth in claim 17, further including means for providing user anonymity.

20. A system for collaborator discovery among a plurality of users as set forth in claim 17, further including means to allow for interaction between users.

21. A system for collaborator discovery among a plurality of users as set forth in claim 17, wherein the entry processor includes an information item type filter operative to eliminate unimportant entries upon receipt from the activity monitor to provide a plurality of filtered entries.

22. A system for collaborator discovery among a plurality of users as set forth in claim 17, wherein,
   a. the entry processor further includes an item association engine, said item association engine linked to the information item type filter to receive the plurality of filtered entries therefrom and to assign a measure of similarity for each pair of particular items; and
   b. the match database further includes means to receive and store the measure of similarity for each pair of particular items from the entry processor.

23. A system for collaborator discovery among a plurality of users as set forth in claim 17, wherein the users of the system access the system by computer and wherein the activity monitor is distributed across the computers used by the users.

24. A system for collaborator discovery among a plurality of users as set forth in claim 17, wherein the activity monitor is centralized.

25. A system for collaborator discovery among a plurality of users as set forth in claim 18, wherein,
   a. the entry processor further includes a scent update engine which receives the plurality of filtered entries from the filter and uniquely associates at least one scent score for each particular item accessed by a particular user; and
   b. the match database further includes means to receive and store the at least one scent score for each particular item accessed by a particular user from the scent update engine.

26. A system for collaborator discovery among a plurality of users as set forth in claim 18, wherein the matcher further includes a diffusion engine linked to the match database to receive the measure of similarity for each pair of particular items and to receive the scent score corresponding to at least one particular item of the pair of particular items for which the measures of similarity were received, and further to utilize the measures of similarity and the at least one scent score to diffuse the at least one scent score from one item of the pair of particular items to the other item of the pair of particular items to generate a diffused scent score, and to incorporate the diffused scent score into the match database.

27. A system for collaborator discovery among a plurality of users as set forth in claim 17, wherein the scent scores are increased in proportion to the number of times a particular item is accessed by a particular user.

28. A system for collaborator discovery among a plurality of users as set forth in claim 19, wherein the users of the system access the system by computer and wherein the means for providing user anonymity is distributed across the computers used by the users.

29. A system for collaborator discovery among a plurality of users as set forth in claim 19, wherein the means for providing user anonymity is centralized.

30. A system for collaborator discovery among a plurality of users as set forth in claim 20, wherein the means to allow for interaction between users is a chat system.

31. A system for collaborator discovery among a plurality of users as set forth in claim 20, wherein the means to allow for interaction between users is an e-mail system.

32. A system for collaborator discovery among a plurality of users as set forth in claim 27, wherein the matcher further includes a decay engine linked to the match database decay the measure of similarity and the at least one scent score for each particular item for each user over time.

33. A system for collaborator discovery among a plurality of users as set forth in claim 27, wherein the at least one scent score associated for each particular user and information item by the entry processor includes a short-term scent score and a long-term scent score where, for each subsequent access of each particular item by a particular user, the entry processor increases the short-term scent score and long-term scent score in proportion to the number of accesses of a particular item by the particular user such that the short-term scent score increases more rapidly than the long-term scent score.

34. A system for collaborator discovery among a plurality of users as set forth in claim 27, wherein a maximum scent score value is set such that when a particular scent score reaches the maximum scent score value, it ceases to increase.

35. A system for collaborator discovery among a plurality of users as set forth in claim 28, wherein the decay engine includes a decay rate used to decay the long-term scent scores and the short-term scent scores over time with the decay rate chosen such that the long-term scent scores decay more slowly than the short-term scent scores.

36. A system for collaborator discovery among a plurality of users as set forth in claim 35,
   a. wherein the entry processor associates short-term scent score and long-term scent scores with each particular user according to the following, $$SS=CS$$
   $$SL=CL$$

wherein SS represents the short-term scent score, SL represents the long-term scent score, and CS and CL are scalar values chosen as scent score values assigned for the first access of a particular item by a particular user;
   b. wherein the short-term scent score and the long-term scent score are increased according to the following, $$SS=SS+(1-SS)*KS \text{ and}$$
   $$SL=SL+(1-SL)*KL, \text{ wherein}$$

SS represents the short-term scent score, SL represents the long-term scent score, KS and KL represent incrementing rates chosen such that KS>KL;
   d. wherein the decay is performed according to the following, $$SS=SS*DS \text{ and}$$
   $$SL=SL*DL, \text{ wherein}$$

SS represents the short-term scent score, SL represents the long-term scent score, DS and DL represent decay rates chosen such that DS<DL.

37. A system for collaborator discovery among a plurality of users as set forth in claim 36, wherein the item from which the scent score is diffused is identified as a source item A and the item to which the scent score is diffused is identified as a destination item B, and the scent score diffusion is performed by the diffusion engine according to, $$\text{if } SS_A>SS_B : SS'_B = SS_B+(SS_A-SS_B)*L_{AB}*r_s, \text{ and}$$

$$\text{if } SL_A>SL_B : SL'_B = SL_B+(SL_A-SL_B)*L_{AB}*r_L, \text{ wherein}$$

$SS_A$ represents the short-term scent for a particular user at the source item A, $SS_B$ represents the short-term scent for a particular user at the destination item B, $SL_A$ represents the long-term scent for a particular user at the source item A, $SL_B$ represents the long-term scent for a particular user at the destination item B, $L_{AB}$ represents the measure of similarity between the source item A and the destination item B, $r_S$ provides a short-term scent diffusion rate, and $r_L$ provides a long-term scent diffusion rate.

38. A system for collaborator discovery among a plurality of users as set forth in claim 37, wherein the matcher correlates the scent scores between user a, representing a particular one of the plurality of users, and user b, representing another of the plurality of users, where item p represents a particular one of the plurality of items, according to the following, $$SS\_Match_{ab} = \frac{\sum_p \frac{SS_{ap} \times SS_{bp}}{Stot_p}}{\sqrt{\sum_p SS_{ap}^2} \sqrt{\sum_p SS_{bp}^2}},$$

$$SL\_Match_{ab} = \frac{\sum_p \frac{SS_{ap} \times SL_{bp}}{Stot_p}}{\sqrt{\sum_p SS_{ap}^2} \sqrt{\sum_p SL_{bp}^2}}, \text{ and}$$

$$LL\_Match_{ab} = \frac{\sum_p \frac{SL_{ap} \times SL_{bp}}{Stot_p}}{\sqrt{\sum_p SL_{ap}^2} \sqrt{\sum_p SL_{bp}^2}}, \text{ where}$$

$SS\_Match_{ab}$ is the match between short-term scent scores of user a and user b;

$SL\_Match_{ab}$ is the match between the short-term scent score of user a and the long-term scent score of user b;

$LL\_Match_{ab}$ is the match between the long-term scent scores of users a and b;

$Stot_p$ is the total number of distinct user scent scores that can be found at item p;

$SS_{ap}$ is the short-term scent score assigned to user a at item p; and $SL_{ap}$ is the long-term scent score assigned to user a at item p.

* * * * *

UNITED STATES PATENT AND TRADEMARK OFFICE
CERTIFICATE OF CORRECTION

| | | |
|---|---|---|
| PATENT NO. | : 6,681,247 B1 | Page 1 of 1 |
| APPLICATION NO. | : 09/420041 | |
| DATED | : January 20, 2004 | |
| INVENTOR(S) | : David Payton | |

It is certified that error appears in the above-identified patent and that said Letters Patent is hereby corrected as shown below:

The following paragraph should be inserted into the first page of the specification immediately following the title and immediately before the "BACKGROUND OF THE INVENTION" section:

-- STATEMENT OF GOVERNMENT RIGHTS
This invention was made with Government support under N66001-96-2-8902 Human Computer Symbiotes awarded by Defense Advanced Research Projects Agency. The Government has certain rights in this invention. --

Signed and Sealed this

First Day of April, 2008

JON W. DUDAS
*Director of the United States Patent and Trademark Office*